United States Patent Office 3,405,071
Patented Oct. 8, 1968

3,405,071
PROCESS OF MAKING MICROCAPSULES
Zoila Reyes, Menlo Park, Calif., assignor, by mesne assignments, to International Business Machines Corporation, New York, N.Y., a corporation of New York
Filed Dec. 30, 1963, Ser. No. 334,458
5 Claims. (Cl. 252—316)

ABSTRACT OF THE DISCLOSURE

A process for making microcapsules having an outer hydrophobic polymer layer grafted onto a gelled hydrophilic polymer containing a polar solution, wherein microscopic swollen hydrophilic particles are irradiated to create reactive sites at their surfaces and added to an emulsion having droplets of a polar solution as its dispersed phase and a non-polar liquid containing a hydrophobic film-forming material susceptible to graft polymerization as its continuous phase, whereby the particles are taken up by the dispersed phase droplets and become gelled, and whereby the hydrophobic material graft polymerizes onto the said reactive sites.

---

Figure 1:
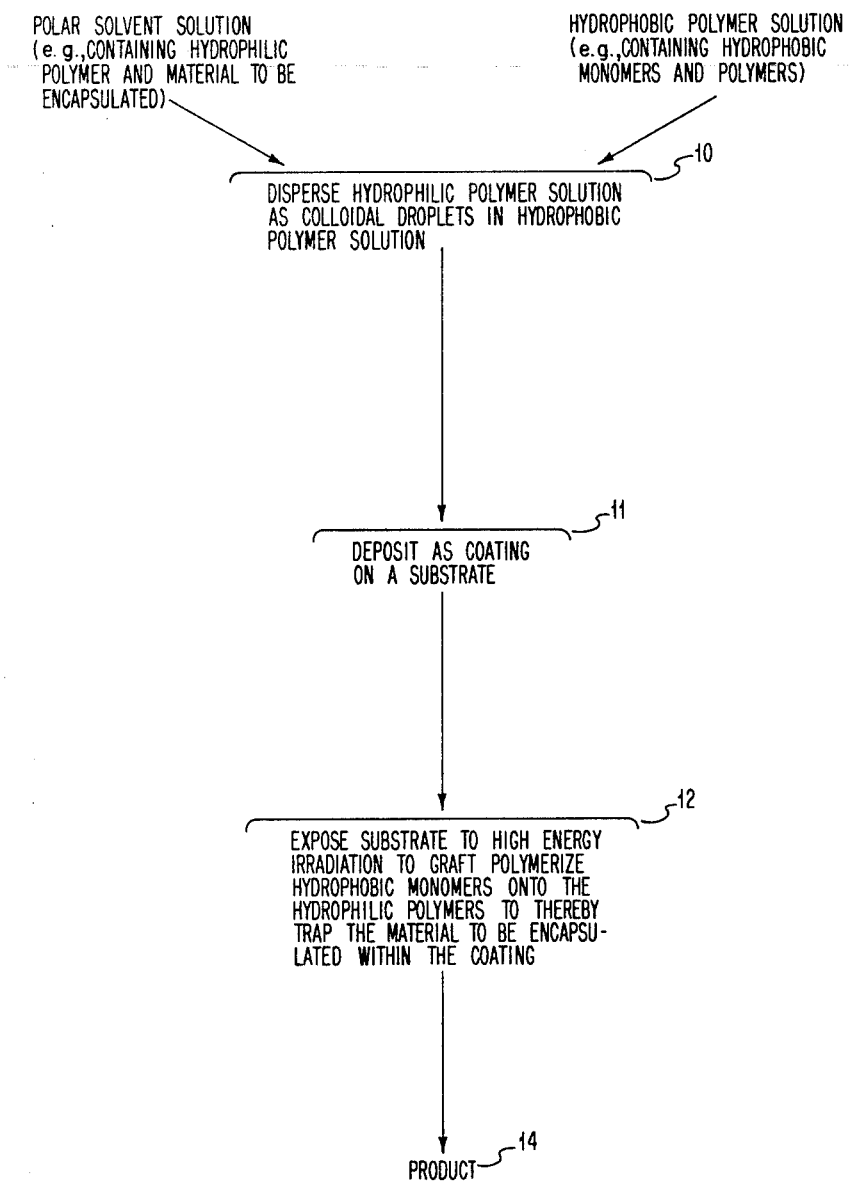

This invention relates to microcapsules and to methods of making the same, and particularly to improved microcapsules formed by graft polymerization techniques and containing water or other polar solvent solutions.

Methods have been developed by which chemically treated papers can be coated with microscopic capsules containing a dye or other marking material reactive with the paper. The advantages of these coated papers is that marking can be made simply by rupture of the wall of the capsule through impact or pressure of a typewriter key, printing roller, stylus or like marking instrument, allowing the dye and the chemical in the paper to combine. The need for an external source of marking fluid is thereby eliminated.

Heretofore, oil containing pressure-rupturable microcapsules have been made through use of a coacervation technique employing gellable hydrophilic colloid material, as disclosed in U.S. Patents 2,800,457 and 2,800,458. Successful use of the microcapsules disclosed in these patents has depended on the encapsulation of water-immiscible oils which are inert with respect to the gel, and which are retained within the porous structure of the gel by the relatively large molecular size of the oil molecules. With microcapsules of this type, marking occurs upon rupture of the capsule through chemisorption of the dye in the paper.

Because the encapsulating gels are not entirely impermeable to the enclosed oil, and in some cases are subject to attack chemically by some oils and materials carried in the oil, attempts have been made to render the capsules more resistant and less oil permeable through use of improved encapsulating techniques and structures. For example, in U.S. Patent 2,969,331 an improved coacervation technique is disclosed whereby an outer capsule or wall of gellable colloid is formed about the oil containing microcapsules. These double-walled microcapsules, while still pressure-rupturable and substantially more impermeable to the enclosed oil than the single-walled capsules, are still subject to a number of distinct shortcomings. For one thing, the porous hydrophilic characteristics of the encapsulating gels prevents the encapsulation of aqueous or similar polar solvent solutions. Also, the necessity of using oils as carriers for the encapsulated components has placed restrictions on the types of materials which can be successfully encapsulated.

In general, it is an object of the present invention to provide an improved process of making microcapsules whereby the encapsulation of water and other polar solvent solutions is made possible.

Another object of the invention is to provide a process of this character making use of hydrophobic polymers in forming the capsule wall, whereby relatively high strength nonporous polymeric microcapsules can be formed.

Another object of the invention is to provide a process of this character making use of graft polymerization techniques.

Another object is to provide a process of this character for making microcapsules in which the solvent transmission characteristics of the capsule are greatly improved.

Another object is to provide a process of such character wherein a compatible hydrophobic monomer or polymer is grafted onto a previously formed, water-containing occlusion, microcapsule or the like.

A still further object is to provide microcapsules in outwardly dry form, either as a thin film-like coating on a substrate, or as isolated units.

Figure 2:
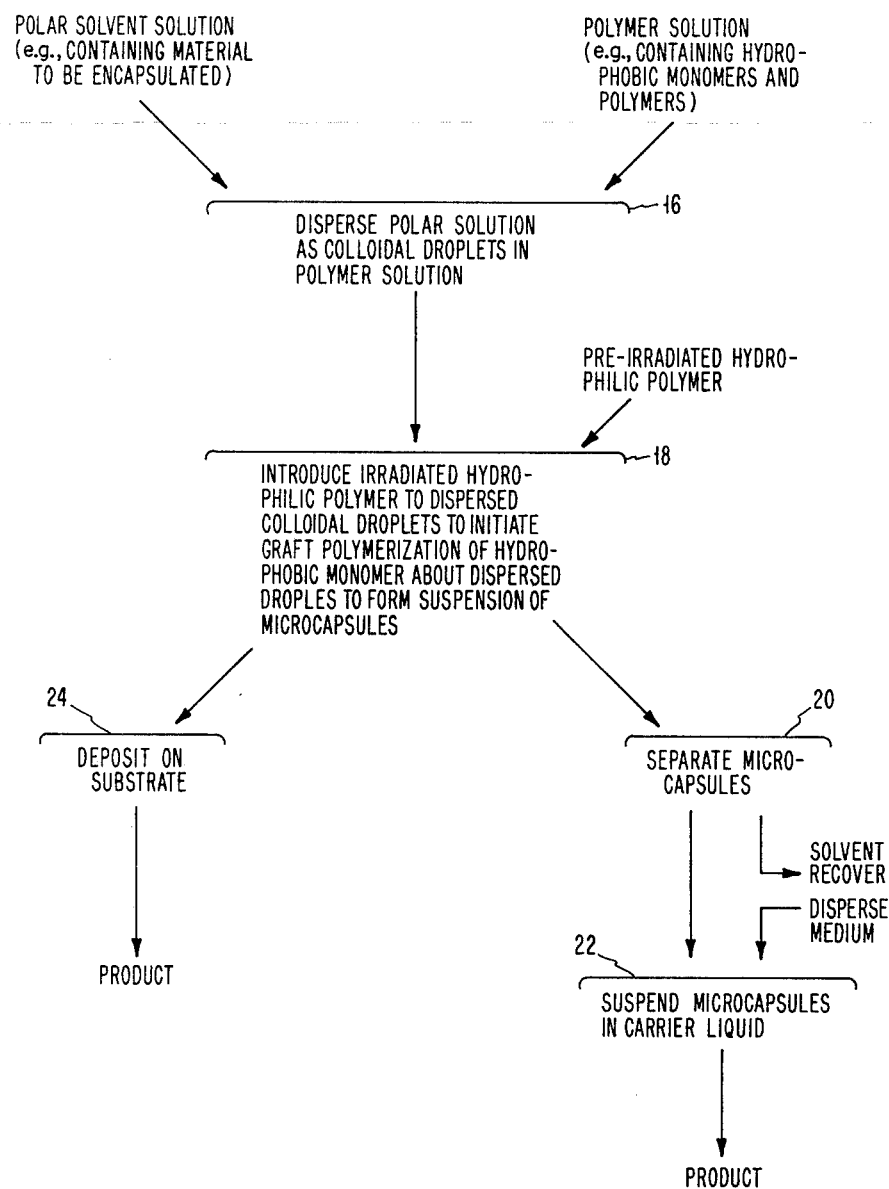

Other objects of the invention will appear from the following description and the drawing in which:

FIGURE 1 is a flow sheet outlining a general procedure for carrying out the invention; and FIGURE 2 is a flow sheet illustrating a particular procedure for carrying out the invention.

The process of the present invention is based upon the discovery that materials in aqueous or polar solvent solution may be initially formed into microscopic cores (e.g., in the form of gelled particles, colloidal droplets, etc.) as an internal aqueous polar phase of a dispersion containing hydrophobic monomers and polymers, following which the monomers can be grafted to the initial core formations to form resultant microcapsules containing aqueous or polar solution. More specifically, it has been determined that graft polymerization techniques can be employed in a highly satisfactory manner upon various materials to be encapsulated, through use of a source of high energy radiation to create reaction sites in the form of free radicals upon which hydrophobic monomers can be successfully grafted as an outer water-impermeable layer. These techniques can be carried out through homopolymerization of the monomer, or through cross linking or copolymerization of a polymer with the monomer or monomers. The resultant microcapsules can be dried to form a fine powder, which is dry to the touch, comprising discrete particles containing aqueous or polar solution.

Microcapsules formed in accordance with the invention can be easily coated by any of a number of well known techniques upon copying papers, which thereafter can be printed and developed "dry" without the use of externally applied chemical solutions or gases. By way of specific illustration, the microcapsules can be employed to isolate an aqueous form of one or more of the components essential to printing or developing diazo paper (Ozalid type), for example, as disclosed in U.S. Letters Patent No. 3,111,407. These microcapsules can then be coated upon a substrate along with the remaining components essential to coupling and dye formation. Depending on the materials encapsulated, marking can be by application of pressure, modified by the application of heat and light as may be desirable or necessary. However, it is not intended that the concepts of the present invention be limited to the encapsulation of any particular materials and the encapsulation of various liquids, aqueous and non-aqueous, is considered to be within the scope of the invention herein disclosed.

Among the aqueous or polar solutions which may be encapsulated in accordance with the present invention are aqueous solutions or dispersions of materials such as dyes, chemical reagents, adhesives, and the like, or such ingredients dissolved or dispersed in dilute aqueous solution such as dilute alkali or acid, or solution of reactive ingredients of such solvents as a solution of one or more components of a dye process, for example, the diazo process mentioned above.

Since the present invention particularly contemplates the encapsulation of various aqueous solutions, the hydrophobic encapsulating monomer or polymer should be characterized by good resistance to the transmission of water vapor. Hydrophobic monomers and polymers possessing this property are generally characterized by a saturated or nearly saturated carbon chain with little or no branching, high lateral and good linear symmetry, and a high proportion of small hydrophobic constituents. Particularly monomers which have been found to satisfy these requirements and to have low moisture permeability include styrene, chloroprene, isoprene, long chain vinyl ethers, and monomers in gaseous form such as ethylene or butadiene (with the gaseous monomers—copolymerization may be carried out under pressure, or by bubbling the gas through the reaction zone). Hydrophobic polymers possessing characteristics of low moisture permeability include the vinyl, acrylate, styrene and polyethylene polymers, and specifically polyvinylidene chloride and its copolymers (e.g., with vinyl chloride, acrylonitrile and isobutylene), stearyl vinyl ether, polyethylene, fluorinated ethylene polymers, and polypropylene. Natural and synthetic rubbers such as butyl rubber, and rubber hydrochloride can also be employed. Other polymers, which are not necessarily water-vapor impermeable by nature, but which can be made resistant or impermeable to water-vapor by blending them with mineral oils, paraffins, waxes, and/or low molecular fractions of structural impermeable polymers, include: cellophane, and various cellulosic derivatives such as ethyl cellulose, cellulose nitrate, cellulose acetate-butyrate, and other mixed and higher esters of cellulose.

In addition to being impermeable to water-vapor, the polymeric materials (monomers and polymers) suitable for use in the present invention should also be characterized by susceptibility to the graft polymerization techniques herein disclosed. Preferably they should also exhibit stability in the presence of alkalis and other reactive ingredients of the dyes normally employed in the various fast printing systems. In some cases a particular monomer or polymer will not possess all the desired characteristics, but can be advantageously blended with other polymeric materials to make them suitable for the purposes of the invention, for example, according to the disclosures of U.S. Letters Patent 3,094,505.

Referring to the drawing, one technique for carrying out my process is broadly outlined in the flow sheet of FIGURE 1. Thus, step 10 represents the formation of the material or solution of the material to be encapsulated into a microscopic core, for example, a gelled hydrophilic polymer or colloidal droplet, containing an aqueous form of the material to be encapsulated. The processing of step 10 is most conveniently carried out by forming a liquid dispersion or emulsion containing a profusion of the microscopic cores dispersed in the external phase liquid which may contain a hydrophobic polymer and a hydrophobic monomer (or a mixture of an active polar monomer and hydrophobic monomer). In step 11, the dispersion is coated onto a substrate, following which the coating is immediately subjected in step 12 to high energy radiation capable of achieving a gain or loss of electrons at the interface between the core and the polymer or monomer, thereby creating free radicals capable of initiating polymerization or graft polymerization. Step 12 thus represents the in situ grafting of a hydrophobic monomer to the reactive sites on the core to produce the desired microcapsule having an outer, water-impermeable polymeric surface. During irradiation homopolymerization or grafting of a monomer onto a polymer occurs. It is contemplated that an active monomer susceptible to free radical polymerization can be employed to initiate the grafting, following which a hydrophobic less active monomer can be copolymerized with the polymer. In any event, to produce microcapsules which are water resistant or water-vapor impermeable, it is essential that the grafted monomer or polymer forming the outer surface of the microcapsule product (represented at 14) be a hydrophobic material.

As a particular example of the processing in accordance with FIGURE 1, the emulsion formed in step 10 may comprise a solution of gellable hydrophilic polymer and aqueous solution as the internal phase and an immiscible organic or nonpolar solvent containing a hydrophobic polymer-forming monomer and a hydrophobic polymer as the external phase. Hydrophobic polymers for use in the external phase of such emulsion should preferably be good film forming polymers, for example, cellulose, polystyrene, polyvinylidene chloride, cellulose acetate butyrate, benzyl cellulose, etc., and the low molecular weight polymers, such as polybutene, polyisobutylene, and various polyethylene oils. Satisfactory polymer forming monomers include vinyl toluene, vinyl ethers, styrenated oils, and various unsaturated fats. The organic solvent should be selected from the low boiling volatile solvents (i.e., below 100° C.) such as methylene chloride, benzene, low boiling petroleum ether, and so on.

The hydrophilic polymer, in the internal phase, is gelled to form a microscopic particle or core containing the aqueous solution to be encapsulated. By way of example, agar agar, alginic acid and derivatives, casein, starch, locust bean gum, polyvinyl alcohol and other gellable colloids can be used as gellable hydrophils. Where alkali solutions are being encapsulated, hydrophilic colloids such as natural gum, starch, and the like may be included in the formulation to increase the initial water holding capacity. After formation of the gelled particles, and the coating of the emulsion in step 11, the coating is subjected in step 12 to direct ionizing irradiation in the form of high speed or high energy particles or electromagnetic waves from a radioactive source. Such source may be fission products from a nuclear reactor, an electron beam, accelerator (e.g., cyclotron or betatron), or a source of gamma rays. Under ordinary conditions, irradiation to the extent of 1 to 5 megarads from a laboratory accelerator (e.g., Vandegraph) is sufficient to cause the hydrophobic polymer-forming monomer to graft onto the hydrophilic gel, or to polymerize upon and about the hydrophilic polymer to form an outer wall of hydrophobic polymer characterized by the desired resistance to the transmission of water vapor.

The product of this processing, represented at 14, is in the form of a coated substrate wherein the coating contains the internal phase solution or material to be encapsulated in the form of a trapped microscopic occlusion or microcapsule.

FIGURE 2 illustrates a variation in my processing wherein a hydrophilic polymer, for example, a suitable core-forming material is initially subjected to ionizing radiation. This preliminary step is represented by the pre-irradiated material introduced at step 18 in the flow sheet. The resultant microscopic core, which again may be in the form of a gelled particle, is introduced to an emulsion of the aqueous or polar solvent solution to be encapsulated, formed in step 16 in the manner previously described. In step 18 the hydrophobic polymer-forming material present in the external phase of the emulsion diffuses into the active sites of the hydrophilic polymer, which initiates graft polymerization of the polymer-forming material upon the surface of the core.

To illustrate the technique shown in FIGURE 2, the formation of the dispersion in step 16 can be conveniently carried out in two stages. Thus the material or solution of the material to be encapsulated can be first emulsified in oil, which may contain a hydrophobic polymer. The emulsion can then be purged with nitrogen to sparge the entrapped oxygen, and a hydrophobic monomer or mixture of an active polar monomer and a hydrophobic monomer can be added. In step 18, a pulverized, pre-irradiated hydrophilic polymer is introduced, preferably under nitrogen. The pre-irradiated hydrophilic material added in step 18 may comprise microscopic particles of casein, agar agar, alginic acid derivatives such as sodium alginate, starch, locust bean gum, polyvinyl alcohol and like gellable colloids which have been pre-irradiated by exposure to a source of high energy radiation (e.g., fission products, electron beam or gamma radiation sources, etc.). When introduced into a dispersion system of the type above described (e.g., a water-in-oil emulsion), as in step 18, these pre-irradiated particles are quickly taken up by the dispersed colloidal droplets of the solution to be encapsulated, which act to swell the hydrophilic polymer. At the same time trapped free radicals in the pre-irradiated polymer initiate graft polymerization of the hydrophobic monomer or monomers in the external phase onto the reactive sites of the core particles, in essentially the manner previously described.

Following step 18, it is generally necessary to isolate the suspended microcapsules, for example, as in step 20. This step varies according to the materials used and the intended use of the microcapsules. By way of illustration, the capsules can be separated from the oil and dispersed in a suitable carrier for coating, in step 22. Alternatively, if a suitable polymer was initially included in the oil phase in step 16, the microcapsules can be coated directly after the graft polymerization step is completed, for example, as represented in step 24.

In carrying out the pocessing of FIGURE 2, hydrophobic polymers suitable for use in the external phase include any of those hydrophobic polymers previously mentioned in connection with the processing of FIGURE 1. In general, the low molecular weight polymers and non-volatile monomers are more useful in the direct radiation grafting. Hydrophobic monomers found to be particularly useful in the processing of FIGURE 2 include styrene, chloroprene, isoprene, long chain vinyl ethers, and the monomers in gaseous form such as ethylene or butadiene. As previously mentioned, copolymerization with the gaseous monomers may be carried out under pressure, or by bubbling the gas through the mixture during reaction. Where it is desirable to mix an active polar monomer with the hydrophobic monomer, active monomers such as acrylonitrile, acrylamide, and methyl methacrylate can be satisfactorily employed.

The following specific examples are representative of the practice of the invention.

Example I

A water-in-oil emulsion was prepared by emulsifying 30 ml. of water in 50 g. of polybutene (Polybutene No. 32, Oronite Chemical Co., molecular wt. approximately 1,200) containing 1 g. sorbitan sesquioleate (e.g., Arlacel C, Atlas Powder Company). The emulsion was diluted with 20 ml. of petroleum ether (60–110° C.) flushed with nitrogen while warming to 30° C. in order to remove any entrapped air. A solution of 1 g. of stearyl vinyl ether in 10 ml. of petroleum ether and 5 ml. of styrene and 5 ml. of acrylonitrile were added. After thoroughly mixing under nitrogen, 4 g. of casein pre-irradiated to 5 mrad. under a cobalt-60 gamma source and 2 g. of triethanolamine were added. The resulting mixture was capped under nitrogen and allowed, after shaking for 5 minutes, to react at room temperature for 24 hours. Then the mixture was treated with low boiling petroleum ether, enough (about 100 ml.) to disperse the particles and dissolve the polybutene. After standing at room temperature for 15 minutes, the petroleum ether layer was decanted and the residual solvent was allowed to evaporate. The resulting coated casein particles contained appreciable amounts of polybutene. Coatings were made with a dispersion of 10 g. of these particles in a solution of 4 g. of benzyl cellulose in 20 ml. of methylene chloride, 20 ml. of carbon tetrachloride and 5 ml. of butanol. In order to ensure better dispersion of the particles, 5 ml. of water was added to the benzyl cellulose solution. Since the particles varied in size, the coatings were irregular but they gave deep black markings on Ozalid paper by pressing the coating against the diazo paper while applying moderate heat.

Example II

The processing of Example I was repeated using pre-irradiated sodium alginate and pre-irradiated wheat starch as the hydrophilic polymer. With the sodium alginate 1 ml. of 3-aminopropanol was used instead of the triethanolamine. Both hydrophilic polymers were irradiated to a dose of 5 mrad. The results were comparable to those obtained with casein.

The foregoing examples illustrate a particular technique of pre-irradiation grafting of vinyl monomers onto swollen hydrophilic polymers, for example, according to the general procedure of FIGURE 2, wherein aqueous solutions of triethanolamine and 3-aminopropanol serve as swelling agents for the hydrophilic polymers, and are themselves encapsulated during the process.

Example III

A warm mixture of Polybutene No. 32 (10.0 g.), oleic acid (0.5 g.), and stearyl vinyl ether (1.0 g.) was emulsified in a solution of casein (2.0 g.) in 20 ml. of water containing 4.0 g. of triethanolamine. The emulsion obtained was treated with a solution of benzyl cellulose (4.0 g.) in a mixture of carbon tetrachloride (20 ml.), methylene chloride (20 ml.) and butanol (5 ml.). The oil-in-water emulsion obtained was then mixed in a Waring Blendor with the following solvent mixture: 50 ml. of methylene chloride, 20 ml. of carbon tetrachloride and 20 ml. of petroleum ether (60–110° C.). A fine water-in-oil emulsion resulted which was coated on paper, and on Mylar film. Samples of the coatings were then irradiated under an electron beam to total dose of 2 and 5 mrad. These coatings developed Ozalid paper as the others.

The foregoing example illustrates the direct radiation grafting and cross linking of hydrophobic monomer-polymer mixtures to swollen hydrophilic polymers, according to the general procedure of FIGURE 1.

What is claimed is:

1. A process of preparing microcapsules having an outer hydrophobic polymeric layer grafted onto a gelled hydrophilic polymer containing a polar solution, said process comprising the steps of:

forming an emulsion having dispersed internal phase droplets of a polar solution and a continuous external phase of a non-polar liquid containing hydrophobic film-forming material susceptible to graft polymerization;

subjecting microscopic swollen hydrophilic polymeric particles to high energy ionizing radiation sufficient to cause the formation of reactive sites at the surface of the particles; and adding said irradiated swollen hydrophilic polymeric particles to said emulsion whereby the particles are taken up by the dispersed phase droplets and become gelled and whereby said hydrophobic material graft polymerizes onto the reactive sites of the gelled hydrophilic particles to form microcapsules having an outer hydrophobic polymeric layer grafted onto a gelled hydrophilic polymer containing a polar solution.

2. The process of claim 1 wherein the gelling of said microscopic hydrophilic polymeric particles in said dispersed phase droplets is caused by a swelling agent for the hydrophilic polymeric particles selected from the group consisting of triethanolamine and 3-aminopropanol.

3. A process as in claim 1 wherein said microscopic hydrophilic polymeric particles are selected from a group of materials consisting of agar agar, alginic acid derivatives, casein, starch, polysaccharides, locust bean gum and polyvinyl alcohol.

4. A process as in claim 1 wherein said hydrophobic material includes a hydrophobic monomer selected from the group of monomers consisting of styrene, chloroprene, isoprene, long chain vinyl ethers, ethylene and butadiene monomers in gaseous form, and an active polar monomer selected from the group consisting of acrylonitrile, acrylamide, and methyl methacrylate.

5. A process as in claim 1 wherein said emulsion is produced by initially forming an emulsion in which the nonpolar liquid constitutes the dispersed internal phase and the polar solution constitutes the continuous external phase, followed by an inversion of the emulsion to produce the emulsion in which the polar solution constitutes the dispersed internal phase.

References Cited
UNITED STATES PATENTS

| | | | |
|---|---|---|---|
| 2,956,899 | 10/1960 | Cline | 117—93.31 X |
| 3,111,407 | 11/1963 | Lindquist et al. | 17—36.8 X |
| 3,242,051 | 3/1966 | Hiestand et al. | |

LEON D. ROSDOL, *Primary Examiner.*

R. D. LOVERING, *Assistant Examiner.*